US012763408B2

(12) United States Patent
Zhang et al.

(10) Patent No.: US 12,763,408 B2
(45) Date of Patent: Oct. 13, 2026

(54) CYLINDRICAL BATTERY STRUCTURE

(71) Applicant: EVE POWER CO., LTD., Jingmen (CN)

(72) Inventors: Lei Zhang, Jingmen (CN); He Zhao, Jingmen (CN); Liming Huang, Jingmen (CN); Yuebin Xu, Jingmen (CN); Wei He, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 965 days.

(21) Appl. No.: 18/003,028

(22) PCT Filed: Oct. 27, 2022

(86) PCT No.: PCT/CN2022/128033
§ 371 (c)(1),
(2) Date: Dec. 22, 2022

(87) PCT Pub. No.: WO2023/221405
PCT Pub. Date: Nov. 23, 2023

(65) Prior Publication Data
US 2024/0234881 A1 Jul. 11, 2024

(30) Foreign Application Priority Data
May 16, 2022 (CN) ........................ 202221166629.X

(51) Int. Cl.
*H01M 50/152* (2021.01)
*H01M 50/107* (2021.01)
(Continued)

(52) U.S. Cl.
CPC ....... *H01M 50/152* (2021.01); *H01M 50/107* (2021.01); *H01M 50/169* (2021.01); *H01M 50/186* (2021.01); *H01M 50/566* (2021.01)

(58) Field of Classification Search
CPC ............. H01M 50/152; H01M 50/107; H01M 50/186; H01M 50/169
See application file for complete search history.

(56) References Cited

U.S. PATENT DOCUMENTS

2011/0223472 A1 9/2011 Ikeda et al.
2023/0352778 A1* 11/2023 Zhu ..................... H01M 50/553
2025/0015362 A1* 1/2025 Guo ................. H01M 10/0422

FOREIGN PATENT DOCUMENTS

CN 101944576 A 1/2011
CN 102810650 A 12/2012
(Continued)

OTHER PUBLICATIONS

International Search Report in International application No. PCT/CN2022/128033, mailed on Jan. 28, 2023.
(Continued)

*Primary Examiner* — Allison Bourke
*Assistant Examiner* — Kayla Elaine Clary
(74) *Attorney, Agent, or Firm* — PV IP PC; Wei Te Chung; Christopher S. Ruprecht

(57) ABSTRACT

The present application relates to the field of battery technology, and discloses a cylindrical battery structure including a cover plate and a housing. The cover plate includes a cover plate main portion and a cover plate connecting portion fixedly connected to each other. One of an edge of the cover plate connecting portion and an edge of the housing is bent to form a bent portion, and another of the edge of the housing and the edge of the cover plate connecting portion is bent to form a hook portion. The hook portion is configured to hang on the bent portion to connect the cover plate and the housing. The cylindrical battery structure disclosed in the application has simpler connection mode, lower connection cost, and faster connection. In
(Continued)

addition, the connection mode has lower requirements on assembly accuracy of workpieces in the housing.

19 Claims, 1 Drawing Sheet

(51) Int. Cl.

| | |
|---|---|
| ***H01M 50/169*** | (2021.01) |
| ***H01M 50/186*** | (2021.01) |
| ***H01M 50/566*** | (2021.01) |

(56) References Cited

FOREIGN PATENT DOCUMENTS

| | | | | |
|---|---|---|---|---|
| CN | 209232864 U | | 8/2019 |
| CN | 215451577 U | * | 1/2022 |
| CN | 216529088 U | | 5/2022 |
| CN | 217589152 U | | 10/2022 |
| JP | 2021131977 A | | 9/2021 |

OTHER PUBLICATIONS

Written Opinion of the International Search Authority in International application No. PCT/CN2022/128033, mailed on Jan. 28, 2023.

European Office Action issued in corresponding European Patent Application No. 22821844.2 dated Mar. 18, 2025, pp. 1-7.

* cited by examiner

CYLINDRICAL BATTERY STRUCTURE

CROSS-REFERENCE TO RELATED APPLICATION

This application is a National Stage Appl. filed under 35 USC 371 of International Patent Application No. PCT/CN2022/128033 with an international filing date of Oct. 27, 2022, designating the United States, and further claims priority to Chinese Patent Application Serial No. 202221166629.X filed to CNIPA on May 16, 2022. The content of the aforementioned application is incorporated herein by reference.

TECHNICAL FIELD

The present application relates to the field of battery technology, Exemplarily, relates to a cylindrical battery structure.

BACKGROUND

In related technologies, a cylindrical battery with an aluminum housing has a cover plate and a housing, and the cover plate and the housing are welded by laser to define a sealed connection therebetween. The sealed connection is difficult to weld, high in welding cost, and low in welding efficiency. In addition, welding the cover plate and the housing requires a higher assembly accuracy of workpieces in the housing, thereby increasing number of equipment used in assembly processes.

SUMMARY

A cylindrical battery structure is provided in the present application, which can reduce a technical cost, provide a fast connection of a cover plate and a housing, and reduce requirements for higher assembly accuracy of workpieces.

A cylindrical battery structure is provided in embodiments of the present application, including:

- a cover plate and a housing, wherein the cover plate includes a cover plate main portion and a cover plate connecting portion fixedly connected to each other, one of an edge of the cover plate connecting portion and an edge of the housing is bent to form a bent portion, and another of the edge of the housing and the edge of the cover plate connecting portion is bent to form a hook portion, and the hook portion is configured to hang on the bent portion to connect the cover plate and the housing.

In an embodiment, the bent portion includes a first bent portion body and a second bent portion body, a bent groove is defined in the first bent portion body, a first end of the second bent portion body is connected to the first bent portion body, a second end of the second bent portion body is bent towards the bent groove and is spaced from a bottom wall of the bent groove, and the second bent portion body divides the bent groove into a first hook groove and a second hook groove;

- the hook portion faces an opening of the bent groove, the hook portion is located in the first hook groove and the second hook groove, the hook portion is hooked on the second bent portion body, and both sides of the hook portion are respectively attached to the bent portion.

In an embodiment, the bent portion further includes a third bent portion body, a first end of the third bent portion body is welded with the cover plate main portion, a second end of the third bent portion body is connected to the first bent portion body, and a connecting groove is defined in the third bent portion body, and a notch of the connecting groove is located at a side of the cover plate connecting portion away from the housing.

In an embodiment, the cover plate connecting portion is welded on the cover plate main portion, and a thickness of the cover plate main portion is greater than a thickness of the cover plate connecting portion.

In an embodiment, an avoidance portion is provided on a connecting position between the cover plate main portion and the cover plate connecting portion, and a depth of the avoidance portion is matched with the thickness of the cover plate connecting portion.

In an embodiment, the thickness of the cover plate main portion ranges from 1.4 mm to 1.6 mm, and the thickness of the cover plate connecting portion ranges from 0.3 mm to 0.5 mm.

In an embodiment, the cylindrical battery structure further includes an upper buffer element and a lower buffer element, wherein the cover plate main portion is sandwiched between the upper buffer element and the lower buffer element.

In an embodiment, a battery cell body is arranged in the housing, and the cylindrical battery structure further includes a busbar, a connecting element, and a terminal; wherein the connecting element successively extends through the lower buffer element, the cover plate main portion, the upper buffer element, and the terminal; the connecting element is riveted with the lower buffer element and the terminal, respectively, and the connecting element is electrically connected to the busbar.

In an embodiment, the connecting element is welded on the busbar.

In an embodiment, a limit boss is arranged at an edge of an end surface of the upper buffer element away from the lower buffer element, the limit boss is arranged around an outer periphery of the upper buffer element to define a limit slot, and the terminal is located in the limit slot.

In an embodiment, the cylindrical battery structure further includes a sealing element, wherein the sealing element is sleeved on the connecting element and sandwiched between the upper buffer element and the lower buffer element, and an outer side surface of the sealing element abuts against the cover plate main portion.

Beneficial effects of the present application are as following: according to the cylindrical battery structure provided in the present application, when the housing is connected to the cover plate, the hook portion of the housing is firstly hanged on the second bent portion body and located in the first hook groove and the second hook groove, so as to realize a fixed connection between the housing and the cover plate. And then, the bent portion is pressed to attach the hook portion to the bent portion, so as to realize a sealed connection between the housing and the cover plate. Compared with related technologies, a connection mode is simpler, a connection cost is reduced, and a fast connection is provided. In addition, the connection mode requires a lower assembly accuracy of the workpieces in the housing.

REFERENCE NUMERALS

- 1, cover plate; 11, cover plate main portion; 12, cover plate connecting portion; 121, first bent portion body; 122, second bent portion body; 123, third bent portion body; 1230, connecting groove; 13, liquid injection hole; 131, flow guide groove; 132, liquid injection groove;
- 2, housing; 21, hook portion;
- 31, upper buffer element; 311, limit boss; 312, positioning bulge;
- 32, lower buffer element; 33, busbar; 34, connecting element; 35, terminal; 351, positioning groove; 36, sealing element.

DETAILED DESCRIPTION OF THE EMBODIMENTS

In description of the present application, it should be noted that, terms “center”, “top”, “bottom”, “left”, “right”, “vertical”, “horizontal”, “inside”, “outside”, etc. indicate an orientation or position relationship based on the figure, which is only for the convenience of describing the application and simplifying the description, rather than indicating or implying that the device or element referred to must have a specific orientation, be constructed and operated in a specific orientation, therefore, it cannot be understood as a limitation on the application. In addition, the terms “first” and “second” are only used to describe the purpose and cannot be understood as indicating or implying relative importance. The terms “first position” and “second position” are two different positions.

In description of the present application, it should be noted that, unless otherwise specified and defined, terms “installation”, “connection together” and “connection” should be understood in a broad sense, Exemplarily, it may be a fixed connection or a detachable connection; it may be a mechanical connection or an electrical connection; it may be a directly connection or an indirectly connection through an intermediate media; and it may be an internal connection of two components or an interaction relationship between two components. For those skilled in the art, meanings of the above terms in the present application can be understood according to situations.

Figure 1:
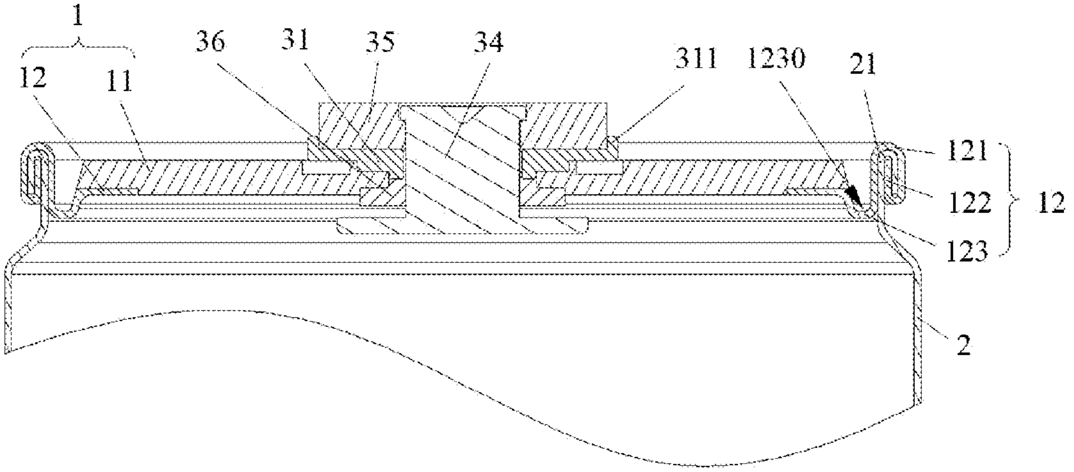
FIG. 1 is a schematic partial sectional diagram of a cylindrical battery structure removing a cylindrical battery, a lower buffer element, a busbar and the like provided by an embodiment of the present application.
Figure 2:
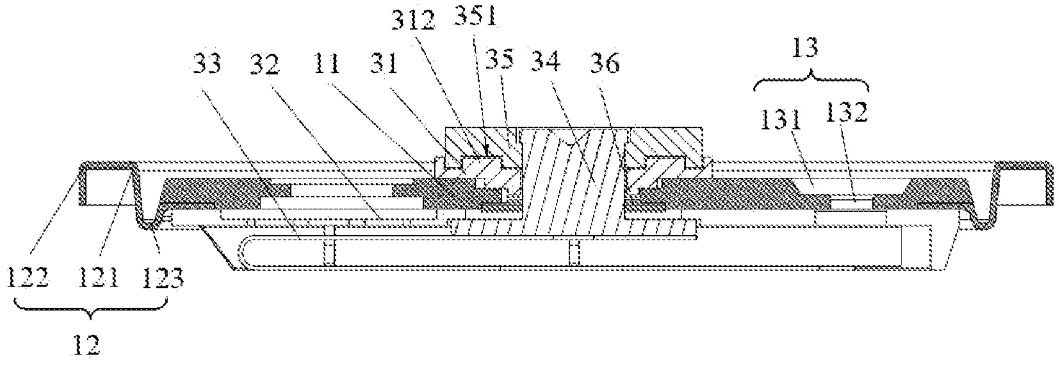
FIG. 2 is a schematic sectional diagram of a cylindrical battery structure removing a housing, a cylindrical battery and the like provided by an embodiment of the present application.

A cylindrical battery structure is provided in an embodiment of the application, as shown in FIG. 1 and FIG. 2. The cylindrical battery structure includes a cover plate 1 and a housing 2. The cover plate 1 includes a cover plate main portion 11 and a cover plate connecting portion 12 fixedly connected to each other. One of an edge of the cover plate connecting portion 12 and an edge of the housing 2 is bent to form a bent portion, and another of the edge of the housing 2 and the edge of the cover plate connecting portion 12 is bent to form a hook portion 21. The hook portion 21 is hanged on the bent portion to connect the cover plate 1 and the housing 2. In the embodiment, the cover plate 1 includes the cover plate main portion 11 and the cover plate connecting portion 12, so that operators can firstly connect the cover plate connecting portion 12 with the housing 2 by bending and winding, and then connect the cover plate connecting portion 12 with the cover plate main portion 11, which is more convenient than bending and winding on the cover plate 1 directly for connection, and improves operation efficiency.

The bent portion includes a first bent portion body 121 and a second bent portion body 122. A bent groove is defined in the first bent portion body 121. A first end of the second bent portion body 122 is connected to the first bent portion body 121. A second end of the second bent portion body 122 bends towards the bent groove and is spaced from a bottom wall of the bent groove. The second bent portion body 122 divides the bent groove into a first hook groove and a second hook groove. The hook portion 21 faces an opening of the bent groove. The hook portion 21 is located in the first hook groove and the second hook groove. The hook portion 21 is hooked on the second bent portion body 122. An inner side and an outer side of the hook portion 21 are respectively attached to the bent portion.

Exemplarily, the edge of the cover plate connecting portion 12 and the edge of the housing 2 may be bent to form the bent portion, or bent to form the hook portion 21. That is, when an outer side of the cover plate connecting portion is bent to form the bent portion, and the edge of the housing 2 is bent to form the hook portion 21. And when the outer side of the cover plate connecting portion is bent to form the hook portion 21, and the edge of the housing 2 is bent to form the bent portion. Thus, the cover plate 1 and the housing 2 can be stably connected. The above two designs are within the protection scope of the present application. It should be noted that the present embodiment is described with an example that the outer side of the cover plate connecting portion is bent to form the bent portion, and the edge of the housing 2 is bent to form the hook portion 21.

The cover plate 1 of the embodiment is an aluminum plate, as shown in FIG. 1 and FIG. 2, when the outer side of the cover plate connecting portion 12 is bent to form a bent portion, the bent portion further includes a third bent portion body 123, a first end of the third bent portion body 123 is welded with the cover plate main portion 11, and a second end of the third bent portion body 123 is connected to the first bent portion body 121. A connecting groove 1230 is defined in the third bent portion body 123, a notch of the connecting groove 1230 is located at a side of the cover plate connecting portion 12 away from the housing 2, and the connecting groove 1230 can increase connection strength of the bent portion.

Exemplarily, the cover plate connecting portion 12 is welded to the cover plate main portion 11, and a thickness of the cover plate main portion 11 is greater than a thickness of the cover plate connecting portion 12. Compared with an integrated cover plate 1 formed by stamping, the processing technology is simpler and easier to realize. Exemplarily, the thickness of the cover plate main portion 11 ranges from 1.4 mm to 1.6 mm to ensure torsional performance of a main body of the cover plate 1. The thickness of the cover plate connecting portion 12 ranges from 0.3 mm to 0.5 mm. If the thickness of the cover plate connecting portion 12 is less than 0.3 mm, a structural strength of the cover plate connecting portion 12 is low and the cover plate connecting portion 12 is easy to break. If the thickness of the cover plate connecting portion 12 is greater than 0.5 mm, the bent portion is easy to crack due to the thick thickness, so that the cover plate connecting portion 12 is easy to break. However, the thickness of the cover plate connecting portion 12 in the embodiment ranges from 0.3 mm to 0.5 mm, which can not only ensure strength of the cover plate connecting portion 12, but also reduce probability of cracking of the cover plate connecting portion 12.

Exemplarily, an avoidance portion is provided on a connecting position between the cover plate main portion 11 and the cover plate connecting portion 12, and a depth of the avoidance portion is matched with the thickness of the cover plate connecting portion 12. That is, the thickness of the cover plate connecting portion 12 is equal to the depth of the avoidance portion, so that it is facilitated to weld the cover plate main portion 11 and the cover plate connecting portion 12, and a plane of the cover plate main portion 11 welded is flatter and smoother. At the same time, it also saves an internal space of the housing 2, which is beneficial to assembly of workpieces in the housing 2.

The cylindrical battery structure provided in the present application, when the housing 2 is connected to the cover plate 1, the hook portion 21 of the housing 2 is hanged on the second bent portion body 122 and located in the first hook groove and the second hook groove, so as to realize a fixed connection between the housing 2 and the cover plate 1. And then, the bent portion is pressed to make the hook portion to attach to the bent portion, so as to realize a sealed connection between the housing 2 and the cover plate 1. Compared with related technologies, a connection mode is simpler, a connection cost is reduced, and a fast connection is provided. In addition, the connection mode requires a low assembly accuracy of the workpieces in the housing 2.

An end of the housing 2 in the embodiment is open, the cover plate 1 is located at an open end of the housing 2. That is, the cylindrical battery structure of the embodiment has only one cover plate 1. Compared with a cylindrical battery structure in which both ends of the housing 2 are open and each open end is provided with a cover plate 1, one cover plate 1 is omitted, which not only simplifies the installation process, but also saves a raw material cost and reduces a production cost of the cylindrical battery. It should be emphasized that the cover plate in the embodiment is not only suitable for the cylindrical battery with one end of the housing open, but also suitable for the cylindrical battery with both ends of the housing open.

As shown in FIG. 1 and FIG. 2, the cylindrical battery structure of the present embodiment further includes an upper buffer element 31, a lower buffer element 32, and a busbar 33. The cover plate main portion 11 is sandwiched between the upper buffer element 31 and the lower buffer element 32. The upper buffer element 31 is configured to separate a terminal 35 from the cover plate main portion 11, and the lower buffer element 32 is configured to separate the busbar 33 from the cover plate main portion 11. A positioning groove 351 is defined in a side of the terminal 35 close to the upper buffer element 31, the upper buffer element 31 is provided with a positioning bulge 312 matched with the positioning groove 351, and the positioning bulge 312 is embedded in the positioning groove 351 to fix the terminal 35.

Exemplarily, the upper buffer element 31 and the lower buffer element 32 are both made of elastic plastic. In another embodiment, the upper buffer element 31 and the lower buffer element 32 may also be made of other elastic materials according to actual needs. A battery cell body (not shown in the figures) is arranged in the housing 2 of the embodiment. As shown in FIG. 1 and FIG. 2, the cylindrical battery structure further includes a connecting element 34, the terminal 35, and a sealing element 36. The connecting element 34 successively extends through the lower buffer element 32, the cover plate main portion 11, the upper buffer element 31, and the terminal 35. The connecting element 34 is riveted with the lower buffer element 32 and the terminal 35, respectively, and the connecting element 34 is welded on the busbar 33 to electrically connect the connecting element 34 to the busbar 33. The sealing element 36 is sleeved on the connecting element 34 and sandwiched between the upper buffer element 31 and the lower buffer element 32. An outer side of the sealing element 36 abuts against the cover plate main portion 11. It should be noted that cross-sectional lines of the lower buffer element 32 and the busbar 33 in FIG. 2 are not shown, and the lower buffer element 32 and the busbar 33 can be referred to a related art, which is not be described here.

A limit boss 311 is arranged at an edge of an end face of the upper buffer element 31 away from the lower buffer element 32, and the limit boss 311 is arranged around an outer periphery of the upper buffer element 31. The limit boss 311 and the upper buffer element 31 define a limit slot, and the terminal 35 is located in the limit slot.

As shown in FIG. 2, the cover plate 1 is provided with a liquid injection hole 13. The liquid injection hole 13 includes a flow guide groove 131, and a liquid injection groove 132 provided at a bottom of the flow guide groove 131. A diameter of the flow guide groove 131 gradually increases from the bottom to a side away from the bottom, thereby facilitating liquid injection.

Before the housing 2 of the cylindrical battery structure of the embodiment is connected to the cover plate 1, the cover plate connecting portion 12 is in a state shown in FIG. 2. When the housing 2 and the cover plate 1 are sealed and connected, the cover plate 1 is firstly buckled on the housing 2, and then the first bent portion body 121 is bent to form a bent groove. The hook portion 21 is positioned in the bent groove, and then the second bent portion body 122 is bent, so that an end of the second bent portion body 122 away from the first bent portion body 121 is located in the hook portion 21 and the hook portion 21 is located in the first hook groove and the second hook groove. At this time, the hook portion 21 is hooked on the end of the second bent portion body 122, and then the bent portion is tightly pressed, so that the hook portion 21 is attached to the bent portion. A sealed connection between the housing 2 and the cover plate 1 is achieved. At this time, the cover plate 1 and the housing 2 are in a connected state as shown in FIG. 1.

What is claimed is:

1. A cylindrical battery structure, comprising: a cover plate and a housing, wherein the cover plate comprises a cover plate main portion and a cover plate connecting portion fixedly connected to each other, one of an edge of the cover plate connecting portion and an edge of the housing is bent to form a bent portion, and another of the edge of the housing and the edge of the cover plate connecting portion is bent to form a hook portion, and the hook portion is configured to hang on the bent portion to connect the cover plate and the housing; and the cover plate connecting portion is welded on the cover plate main portion, and a thickness of the cover plate main portion is greater than a thickness of the cover plate connecting portion.

2. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove;

the hook portion faces an opening of the bent groove, the hook portion is located in the first hook groove and the second hook groove, the hook portion is hooked on the second bent portion body, and both sides of the hook portion are respectively attached to the bent portion.

3. The cylindrical battery structure of claim 2, wherein the bent portion further comprises a third bent portion body, a first end of the third bent portion body is welded with the cover plate main portion, a second end of the third bent portion body is connected to the first bent portion body, a connecting groove is defined in the third bent portion body, and a notch of the connecting groove is located at a side of the cover plate connecting portion away from the housing.

4. The cylindrical battery structure of claim 1, wherein an avoidance portion is provided on a connecting position between the cover plate main portion and the cover plate connecting portion, and a depth of the avoidance portion is matched with the thickness of the cover plate connecting portion.

5. The cylindrical battery structure of claim 1, wherein the thickness of the cover plate main portion ranges from 1.4 mm to 1.6 mm, and the thickness of the cover plate connecting portion ranges from 0.3 mm to 0.5 mm.

6. The cylindrical battery structure of claim 1, further comprising an upper buffer element and a lower buffer element, wherein the cover plate main portion is sandwiched between the upper buffer element and the lower buffer element.

7. The cylindrical battery structure of claim 6, wherein a battery cell body is arranged in the housing, and the cylindrical battery structure further comprises a busbar, a connecting element, and a terminal; wherein the connecting element successively extends through the lower buffer element, the cover plate main portion, the upper buffer element, and the terminal; wherein the connecting element is riveted with the lower buffer element and the terminal, respectively, and the connecting element is electrically connected to the busbar.

8. The cylindrical battery structure of claim 7, wherein the connecting element is welded on the busbar.

9. The cylindrical battery structure of claim 7, wherein a limit boss is arranged at an edge of an end face of the upper buffer element away from the lower buffer element, the limit boss is arranged around an outer periphery of the upper buffer element to define a limit slot, and the terminal is located in the limit slot.

10. The cylindrical battery structure of claim 7, further comprising a sealing element, wherein the sealing element is sleeved on the connecting element and sandwiched between the upper buffer element and the lower buffer element, and an outer side of the sealing element abuts against the cover plate main portion.

11. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove; the hook portion faces an opening of the bent groove, the hook portion is located in the first hook groove and the second hook groove, the hook portion is hooked on the second bent portion body, and both sides of the hook portion are respectively attached to the bent portion.

12. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove; the hook portion faces an opening of the bent groove, the hook portion is located in the first hook groove and the second hook groove, the hook portion is hooked on the second bent portion body, and both sides of the hook portion are respectively attached to the bent portion; the bent portion further comprises a third bent portion body, a first end of the third bent portion body is welded with the cover plate main portion, a second end of the third bent portion body is connected to the first bent portion body, a connecting groove is defined in the third bent portion body, and a notch of the connecting groove is located at a side of the cover plate connecting portion away from the housing.

13. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove; the hook portion faces an opening of the bent groove, the hook portion is located in the first hook groove and the second hook groove, the hook portion is hooked on the second bent portion body, and both sides of the hook portion are respectively attached to the bent portion; and an avoidance portion is provided on a connecting position between the cover plate main portion and the cover plate connecting portion, and a depth of the avoidance portion is matched with the thickness of the cover plate connecting portion.

14. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove; the hook portion faces an opening of the bent groove, the hook portion is located in the first hook groove and the second hook groove, the hook portion is hooked on the second bent portion body, and both sides of the hook portion are respectively attached to the bent portion; the bent portion further comprises a third bent portion body, a first end of the third bent portion body is welded with the cover plate main portion, a second end of the third bent portion body is connected to the first bent portion body, a connecting groove is defined in the third bent portion body, and a notch of the connecting groove is located at a side of the cover plate connecting portion away from the housing; and an avoidance portion is provided on a connecting position between the cover plate main portion and the cover plate connecting portion, and a depth of the avoidance portion is matched with the thickness of the cover plate connecting portion.

15. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove; the hook portion faces an opening of the bent groove, the hook portion is located in the first hook groove and the second hook groove, the hook portion is hooked on the second bent portion body, and both sides of the hook portion are respectively attached to the bent portion; and the thickness of the cover plate main portion ranges from 1.4 mm to 1.6 mm, and the thickness of the cover plate connecting portion ranges from 0.3 mm to 0.5 mm.

16. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove;

the hook portion faces an opening of the bent groove, the hook portion is located in the first hook groove and the second hook groove, the hook portion is hooked on the second bent portion body, and both sides of the hook portion are respectively attached to the bent portion; and wherein the cylindrical battery structure further comprises an upper buffer element and a lower buffer element, wherein the cover plate main portion is sandwiched between the upper buffer element and the lower buffer element.

17. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove;

the hook portion faces an opening of the bent groove, the hook portion is located in the first hook groove and the second hook groove, the hook portion is hooked on the second bent portion body, and both sides of the hook portion are respectively attached to the bent portion;

the bent portion further comprises a third bent portion body, a first end of the third bent portion body is welded with the cover plate main portion, a second end of the third bent portion body is connected to the first bent portion body, a connecting groove is defined in the third bent portion body, and a notch of the connecting groove is located at a side of the cover plate connecting portion away from the housing; and wherein the cylindrical battery structure further comprises an upper buffer element and a lower buffer element, wherein the cover plate main portion is sandwiched between the upper buffer element and the lower buffer element.

18. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove;

the hook portion faces an opening of the bent groove, the hook portion is located in the first hook groove and the second hook groove, the hook portion is hooked on the second bent portion body, and both sides of the hook portion are respectively attached to the bent portion;

wherein the cylindrical battery structure further comprises an upper buffer element and a lower buffer element, wherein the cover plate main portion is sandwiched between the upper buffer element and the lower buffer element; and a battery cell body is arranged in the housing, and the cylindrical battery structure further comprises a busbar, a connecting element, and a terminal; wherein the connecting element successively extends through the lower buffer element, the cover plate main portion, the upper buffer element, and the terminal; wherein the connecting element is riveted with the lower buffer element and the terminal, respectively, and the connecting element is electrically connected to the busbar.

19. The cylindrical battery structure of claim 1, wherein the bent portion comprises a first bent portion body and a second bent portion body, a bent groove is defined in the first bent portion body, a first end of the second bent portion body is connected to the first bent portion body, a second end of the second bent portion body is bent towards the bent groove and is apart from a bottom wall of the bent groove, and the second bent portion body divides the bent groove into a first hook groove and a second hook groove;

the hook portion faces an opening of the bent groove, the hook portion is located in the first hook groove and the second hook groove, the hook portion is hooked on the second bent portion body, and both sides of the hook portion are respectively attached to the bent portion;

the bent portion further comprises a third bent portion body, a first end of the third bent portion body is welded with the cover plate main portion, a second end of the third bent portion body is connected to the first bent portion body, a connecting groove is defined in the third bent portion body, and a notch of the connecting groove is located at a side of the cover plate connecting portion away from the housing;

wherein the cylindrical battery structure further comprises an upper buffer element and a lower buffer element, wherein the cover plate main portion is sandwiched between the upper buffer element and the lower buffer element; and a battery cell body is arranged in the housing, and the cylindrical battery structure further comprises a busbar, a connecting element, and a terminal; wherein the connecting element successively extends through the lower buffer element, the cover plate main portion, the upper buffer element, and the terminal; wherein the connecting element is riveted with the lower buffer element and the terminal, respectively, and the connecting element is electrically connected to the busbar.

* * * * *